United States Patent Office 2,861,050
Patented Nov. 18, 1958

2,861,050

METHOD OF PREPARING INTERPOLYMERS OF A VINYL ESTER, A CONJUGATED DIENE HYDROCARBON, AND AN ETHYLENICALLY UNSATURATED MONOMER, AND PRODUCT THEREOF

Roger M. Christenson, Milwaukee, Wis., assignor to Pittsburgh Plate Glass Company, Pittsburgh, Pa., a corporation No Drawing. Application September 15, 1953
Serial No. 380,358

5 Claims. (Cl. 260—33.6)

This invention relates to the preparation of novel interpolymers useful for surface coating compositions and it pertains more particularly to soluble, non-rubbery interpolymers of (A) an ester of a fatty acid and an ethylenically unsaturated alcohol, (B) a conjugated diene hydrocarbon and (C) an ethylenically unsaturated monomer containing a $>C=CH_2$ group.

Esters of alcohols containing a $>C=CH_2$ group, usually in terminal position, with fatty acids containing at least 8 carbons are readily and economically prepared by several known methods. The relative ease with which such esters are obtained has led to many attempts to utilize them for surface coating compositions. However, the unsaturated esters of fatty acids containing at least 8 carbon atoms homopolymerize only with great difficulty. Consequently, their use in the form of homopolymers is extremely limited. It was found, however, that such esters copolymerize with ethylenically unsaturated monomers such as vinyl acetate, vinyl benzoate, vinyl halides and vinyl ethers to form two component interpolymers having certain useful properties desired in surface coating compositions. The two component copolymers suffer from certain serious disadvantages, however. For example, two component interpolymers of unsaturated fatty acid esters and vinyl acetate exhibit little resistance to the action of chemicals, especially alkalis, and two component interpolymers of esters of unsaturated fatty acids with vinyl chloride are not homogeneous interpolymers and possess poor solubility in solvents such as toluene, xylene, petroleum naphthas and other materials which are customarily employed in preparing coating compositions. Other of the two component interpolymers possess the same and even other disadvantages which tend to overcome to a large extent the advantages which they impart to the coating compositions.

It has also been proposed to prepare interpolymers comprising major amounts of a conjugated diene hydrocarbon such as butadiene, isoprene, piperylene and minor amounts respectively of monomers such as styrene, paramethyl-alpha methylstyrene, acrylonitrile and others, with esters of fatty acids and ethylenically unsaturated alcohols. In general, the interpolymers so prepared contained only about 5 to 15 percent of the latter component. Such interpolymers are rubbery materials which are insoluble or form gels in most solvents such as xylene, toluene and the like, and therefore, are unsuitable for use in the formation of coating compositions.

The surprising discovery has now been made that valuable interpolymers, which are non-rubbery, soluble in xylene, toluene and other economically obtained hydrocarbon solvents and which are valuable for coating purposes may be prepared by the interpolymerization of (A) alkenyl mono-esters of higher fatty acids, where the alcohol component is ethylenic, (B) a conjugated diene and (C) ethylenically unsaturated monomers. In preparing these novel interpolymers, it is preferable to employ the ester of the higher fatty acid and the unsaturated alcohols in relatively large amounts, the conjugated diene being employed in relatively smaller amounts with respect to the ester of the fatty acid than in the conventional rubber-like materials.

The unsaturated ester of a fatty acid utilized in preparing the interpolymers of the present invention may be derived from any fatty acid containing at least 8 carbon atoms. These include the acids of such oils as linseed oil, cottonseed oil, castor oil, olive oil, safflower oil, palm oil, coconut oil, fish oils, Chinawood oils, peanut oil, oiticica oil and soybean oil. The fatty acids contained in such oils, all of which are generally designated as glyceride oils, will usually contain from 12 to 18 or even more carbon atoms and include caprylic acid, lauric acid, stearic acid, palmitic acid, arachidic acid, oleic acid, linoleic acid, linolenic acid, ricinoleic acid, and the like. Fatty acids from non-glyceride sources such as tall oil and the like can also be utilized. The pure acids may be employed, but usually the sources consist of mixtures of several of the acids. These mixtures are ordinarily employed in the preparation of the esters without fractionation of the components thereof. While both saturated and unsaturated fatty acids may be utilized, the unsaturated acids are superior to the saturated acids and are greatly preferred for use in preparing interploymers with ethylenically unsaturated monomers because they possess both cross-linking and plasticizing properties not possessed by the saturated acids. The further cross-linking or second stage polymerization on baking is considered very desirable in that it gives a tougher, less soluble film. It is to be understood however, that interpolymers prepared from alkenyl esters of saturated fatty acids are useful for many purposes and are included within the scope of the present invention.

The unsaturated alcohol radical of the fatty acid ester may be any radical containing the $CH_2=C<$ group, generally in the terminal position. Vinyl esters of fatty acids are greatly preferred, although the ester radical may also be allyl or a substituted allyl radical, a cyclopentenyl radical, or the radical may be supplied by alcohols containing the vinyl ether group, such as the mono-vinyl ether of ethylene or diethylene glycol, the allyl ether alcohols, such as the allyl ether of ethylene, or diethylene glycols and the like. Certain of the unsaturated esters of fatty acids are readily prepared by a simple esterification reaction. However, inasmuch as vinyl alcohol is an unknown chemical compound, the vinyl esters thereof cannot be prepared by a simple esterification reaction. They may, however, be prepared by several well known methods; for example, by the reaction of acetylene with the fatty acid in the presence of a zinc or cadmium soap as a catalyst, or by an interchange reaction of the fatty acid with vinyl acetate or the like.

Conjugated dienes which may be employed as the diene component of the interpolymers of the present invention include those well known compounds familiar in the preparation of synthetic rubbers and similar materials. Such conjugated dienes may for example be butadiene, isoprene, piperylene, 1,3-dimethyl butadiene-1,3, hexadiene-1,3, 2-ethyl butadiene-1,3, chloroprene, 4-methyl pentadiene-1,3, myrcene, 2,3-methylbutadiene-1,3, 1,4-dimethyl butadiene-1,3, cyclopentadiene, cyclohexadiene, and the like. Dicyclopentadiene, and other lower homopolymers of cyclopentadiene, which crack when heated to form cyclopentadiene are included within the scope of the present invention. Mixtures of two or more conjugated dienes may also be used.

The ethylenically unsaturated monomer which is interpolymerized with the alkenyl esters of fatty acids and the conjugated dienes to form the interpolymers of the present invention may be any compound having at least one terminal ethylenic group which is not in conjugated relationship to any other aliphatic ethylenic group. By ethylenic group is meant the group $>C=C<$. Generally, the monomers are fluid and many contain a negative group. Such compounds possessing the terminal $CH_2=C<$ grouping and which may be utilized in preparing interpolymers with unsaturated esters of fatty acids include:

(1) Monoolefinic hydrocarbons, that is, monomers containing only atoms of hydrogen and carbon, such as styrene, alpha-methyl styrene, alpha-ethyl styrene, alpha-butyl styrene, vinyl toluene, isobutylene (2-methyl propene-1), 2-methyl propene-1, 2-methyl-butene-1, 2-methyl-pentene-1, 2, 3-dimethyl-butene-1, 2, 3-dimethyl-pentene-1, 2, 4-dimethyl-pentene-1, 2, 3, 3-trimethyl-butene-1, 2-methyl-heptene-1, 2, 3-dimethyl-hexene-1, 2, 4-dimethyl-hexene-1, 2, 5-dimethyl-hexene-1, 2-methyl-3-ethyl-pentene-1, 2, 3, 3-trimethyl-pentene-1, 2, 3, 4-trimethyl-pentene-1, 2, 4, 4-trimethyl-pentene-1, 2-methyl-octene-1, 2, 6-dimethyl-heptene-1, 2, 6-dimethyl-octene-1, 2, 3-dimethyl-decene-1, 2-methyl-nonadecene-1, ethylene, propylene, butylene, amylene, hexylene and the like:

(2) Halogenated monoolefinic hydrocarbons, that is, monomers containing carbon, hydrogen and one or more halogen atoms such as alpha-chlorostyrene, alphabromostyrene, 2,5-dichlorostyrene, 2,5-dibromostyrene, 3, 4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate, and similar vinyl halobenzoates, vinyl p-methoxybenzoate, vinyl-o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate.

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, and methallyl esters corresponding to the above allyl esters, as well as esters from such alkenyl alcohols as beta-ethyl allyl alcohol, beta-propyl allyl alcohol, 1-buten-4-ol, 2-methyl-buten-ol-4, 2(2,2-dimethyl propyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromacrylate, amyl alpha-chloroacrylate, octyl alpha-chloroacrylate, 3,5,5-trimethyl-hexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenonitrile, crotononitrile, oleonitrile, and the like;

(5) Acid monomers such as acrylic acid, methacrylic acid, crotonic acid, 3-butenoic acid, angelic acid, tiglic acid and the like;

(6) Organic amides such as acrylamide, methacrylamide, n-tertiary butyl acrylamide, methylene bis-acrylamide and the like.

Any one, two or even more of the above listed monomers may be included in an interpolymerizable mixture of (A) an ester of a fatty acid and an ethylenically unsaturated alcohol and (B) a conjugated diene or dienes.

In the practice of the present invention, the relative proportions of the several components of the interpolymerizable mixture may be varied substantially. Useful products may be prepared when the several components fall approximately within the following ranges:

| | Percent |
|---|---|
| Fatty acid - ethylenically unsaturated alcohol esters | 20 to 50 |
| Ethylenically unsaturated monomer | 20 to 50 |
| Conjugated diene | 40 to 10 |

The percentages given above are by weight. It is to be understood, of course, that the several components are so proportioned that the sum of the percentages equals 100.

When the proportion of the conjugated diene is substantially increased with respect to the ester of the higher fatty acid and the ethlenically unsaturated alcohol, above those given, rubbery insoluble products result.

The reaction may be conducted in mass, that is, in the absence of non-reactive solvents or diluents. If desired, however, solvents or diluents may be included in the reaction mixture. Appropriate solvent media include xylene, toluene, and like petroleum hydrocarbons. The reaction may be conducted under a reflux condenser designed to condense and return any non-reacted components of the system to the reaction zone. However, it is usually preferred to conduct the reaction in a suitably enclosed container such as a reaction bomb, an autoclave, or the like, designed to retain the reactants under pressure and free from oxygen or oxygen-containing gases such as air, which may have a deleterious effect on the course of the reaction.

The reaction temperature employed in preparing the interpolymers is within a range above that which the reaction proceeds at a reasonable rate and below that at which the reactants or the products of reaction tend unduly to decompose to produce charred or discolored materials. A reaction temperature of about 50° C. to 200° C. is generally utilized, although higher or lower temperatures may be employed if desired.

The time of reaction is susceptible of variation, depending upon the degree of completion desired in the reaction, the temperature of reaction and various other factors. Usually the reaction will have proceeded to a maximum conversion within a period of about 5 to 30 hours.

Free radical initiators such as benzoyl peroxide, cumene hydroperoxide, tertiary butyl hydroperoxide, lauroyl peroxide, boron trifluoride or the diazo compounds may be added in catalytic amounts, for example, 0.1 to 5 or 10 percent by weight, in order to speed up the polymerization; however, the invention also includes polymerization in the absence of such initiators.

It is to be understood that the conjugated dienes, such as butadiene and the like, may react with the vinyl group in the fatty acid ester. They will also tend to react with the double bonds (if any) in the fatty acid components of the esters. In so reacting, a single double bond of the conjugated diene compound is reacted with on ethylenic group leaving the other double bond of the conjugated diene free and susceptible of further reaction with each other or with other reactive groups. If a film of the interpolymer is baked, these double bonds may produce cross-linking effects.

It will be understood that the conjugated dienes and the adducts thereof formed in the reaction in which but one of the double bonds is subjected to saturation by addition reaction, are also capable to some extent, of addition reaction with the double bonds of the ethylenically unsaturated monomeric compounds.

The interpolymers may be appropriately diluted with solvents such as xylene or toluene and spread and dried to provide protective films on wood, metal, stone or the like. The drying often involves further reaction, for example, by cross-linking at points of unsaturation. To promote such drying, siccatives such as the soluble organic salts of metals such as nickel, cobalt, lead, chromium, cerium, lanthanum, or the like may be added in small catalytic amount.

Drying or curing of the films may be promoted by baking in an oven, or under infrared radiation, at a temperature of 200° F. to 400° F., or at such other temperature as will not decompose the films. Baking may be continued until the film is hard and non-tacky to touch. Drying may also be effected or promoted by actinic irradiation.

The preparation of interploymers of (A) an ester of an ethylenically unsaturated alcohol and a fatty acid (B) a conjugated diene hydrocarbon and (C) monomers containing a single ethylenic group, or in some instances a plurality of ethylenic groups is illustrated by the following examples.

*Example I*

In this example, vinyl esters of soya oil acids, vinyl chloride and butadiene were introduced into a bomb type reactor in proportions respectively of 20, 60 and 20 percent by weight, and the mixture was catalyzed with 4 percent by weight, based upon the change, of benzoyl peroxide. The reaction temperature was maintained at 75° C. for a period of 15 hours. The product was non-rubbery and had a viscosity of A on the Gardner-Holdt scale when dissolved in xylene in an amount to provide 49.8 percent total solids.

This product, can be applied as a film to surfaces of wood, metal, stone and the like. It is susceptible to drying by baking or by irradiation with actinic light.

*Example II*

In this example, a solution was prepared comprising 33⅓ percent vinyl esters of soya oil acids, 33⅓ percent styrene and 33⅓ butadiene. The mixture was catalyzed with 1.66 percent (by weight based upon the interpolymerizable mixture) of cumene hydroperoxide. The mixture was reacted in a bomb reactor at 135° C. for 16 hours to provide a product which was non-rubbery and was of a viscosity of N+, when diluted to a total solids content of 49.6 percent by weight in xylene. Samples of this product were incorporated with a commercial drier composition containing upon the basis of interpolymer, 0.3 percent of lead and 0.03 percent of cobalt calculated as metal. Any suitable soluble salts of lead and cobalt such as naphthenates, oleates, or the like may be employed as driers. Test panels of glass were coated with the solution and were then baked for one hour at 300° F. The resultant films were resistant to alkali and had a Sward hardness of 26.

*Example III*

In this example, a mixture comprising vinyl esters of soya oil acids 33⅓ percent, vinyl toluene 33⅓ percent, butadiene 33⅓ percent, and 1.66 percent of cumene hydroperoxide (catalyst) was charged in the reaction bomb and heated at 135° C. for 16 hours. The product was non-rubbery and when diluted with xylene to 50.4 solids content, had a viscosity of M+ on the Gardner-Holdt scale. The solution was catalyzed with a drier comprising 0.3 percent by weight of lead and 0.03 percent by weight of cobalt (percentages based on the weight of the copolymer product). The films thereof baked at 300° F. for 1 hour on a glass panel, were of good alkali resistance and possessed a Sward hardness of 28.

*Example IV*

In this example, substitute an equal weight of isoprene for butadiene in Example III and proceed substantially as in the former example. The product is non-rubbery and when diluted with xylene to a total solids content, of 49.7 percent has a viscosity of B on the Gardner-Holdt scale. This interpolymer solution may be catalyzed with the lead-cobalt drier described in Example III and spread as a film and baked at 300° F. for one hour. The product when spread upon a glass panel has a Sward hardness of 30. The films are clear.

*Example V*

In accordance with this example, equal parts by weight of vinyl esters of soya oil acids, butadiene and alpha-methylstyrene are catalyzed with 1.66 percent by weight of cumene hydroperoxide and the mixture is heated at 135° C. for 16 hours in a reaction bomb already described. The reaction product was non-rubbery and when made up to 49.6 percent total solids in xylene, has a viscosity of F+ on the Gardner-Holdt scale. This solution can be catalyzed with the same drier and in the same proportions specified in the foregoing examples, and when baked for one hour at 300° F., provides a product of a Sward hardness of 26.

It is to be understod that vinyl soyate in the preceeding examples, may be replaced by esters of ethylenically unsaturated alcohols and acids of other drying oils, or oils of semi-drying, or non-drying oils. For example, vinyl soyate may be replaced by vinyl or allyl ester of linseed oil acids or cottonseed oil acids or mixtures of the same. Likewise, the vinyl soyate may be replaced by vinyl or allyl esters of coconut oil acids or of similar oils in which the acid components are essentially saturated. Butadiene and isoprene, in the foregoing examples, may be replaced by any of the conjugated dienes herein described, or by other conjugated dienes similar thereto. The monomers of the examples may also be replaced by other of the monomers disclosed hereinabove.

Solutions of the interpolymers in the solvents disclosed hereinabove may also be pigmented with conventional pigments such as titanium dioxide, lead oxide, zinc oxide, cadmium sulfide or the like to form useful coating compositions. Such compositions may be used as surface coatings, on objects made of wood, metal, paper, or the like.

From the foregoing description of the invention, it will be seen that the interpolymers of the present invention constitute a new and useful class of polymeric materials. It is apparent therefore, that various embodiments of the invention, in addition to those specifically disclosed, may be provided without departing from the spirit and scope of the invention as defined in the appended claims.

What is claimed:

1. In a method of forming a heat curable interpolymer which is soluble in xylene and is non-rubbery, said method comprising heating a mixture of (A) about 20 percent to 50 percent by weight of a vinyl ester of a fatty acid containing at least 8 carbon atoms, (B) about 40 percent to 10 percent by weight of a conjugate diene, (C) about 20 percent to 40 percent by weight of at least one compound having at least one terminal ethylenic group which is not in conjugate relationship to any aliphatic ethylenic group and (D) about 0.1 to 10 percent by weight of an organic peroxide which is a catalyst of interpolymerization of the mixture whereby to effect solution of components (A), (B) and (C) in each other and continuing to heat the solution until said interpolymer is formed.

2. The product produced by the process of claim 1.

3. A solution of the product produced by the process of claim 1 in a solvent selected from the group consisting of xylene, toluene and petroleum naphthas.

4. A method of forming a heat curable interpolymer which is soluble in xylene and which is non-rubbery, said method comprising heating in a bomb a mixture of (A) about 20 percent to 50 percent by weight of a vinyl ester of a fatty acid containing at least 8 carbon atoms, (B) about 40 percent to 10 percent by weight of a conjugate diene, (C) about 20 percent to 40 percent by weight of at least one compound having at least one terminal ethylenic group which is not in conjugate relationship to any aliphatic ethylenic group and (D) about 0.1 to 10 percent by weight of an organic peroxide which is a catalyst of interpolymerization whereby to effect solution of components (A), (B) and (C) in each other and continuing to heat the solution in the bomb until said interpolymer is formed.

5. A method of forming a heat curable interpolymer which is soluble in xylene and non-rubbery, which method comprises heating in a bomb, a homogeneous mixture comprising (A) about 20 percent to 50 percent by weight of a vinyl ester of a fatty acid of an unsaturated glyceride oil, (B) about 40 percent to 10 percent by weight of a conjugate diene, (C) about 20 percent to 40 percent by weight of a vinyl compound of a class consisting of styrene, alpha-methyl styrene, vinyl toluene and vinyl acetate and (D) about 0.1 to about 10 percent by weight of an organic peroxide which is a catalyst of interpolymerization, until said interpolymer is formed.

References Cited in the file of this patent

UNITED STATES PATENTS

| | | |
|---|---|---|
| 2,437,420 | D'Alelio | Mar. 9, 1948 |
| 2,518,509 | Weber et al. | Aug. 15, 1950 |
| 2,526,654 | Gleason et al. | Oct. 24, 1950 |

UNITED STATES PATENT OFFICE
CERTIFICATE OF CORRECTION

Patent No. 2,861,050            November 18, 1958

Roger M. Christenson

It is hereby certified that error appears in the printed specification of the above numbered patent requiring correction and that the said Letters Patent should read as corrected below.

Column 5, line 16, for "on ethylenic" read -- an ethylenic --; line 68, for "33 1/3 butadiene" read -- 33 1/3 percent butadiene --; column 6, line 47, for "oue" read -- one --; line 49, for "understod" read -- understood --.

Signed and sealed this 19th day of May 1959.

(SEAL)
Attest:

KARL H. AXLINE
Attesting Officer

ROBERT C. WATSON
Commissioner of Patents